United States Patent
Krieg et al.

(10) Patent No.: US 9,093,830 B2
(45) Date of Patent: Jul. 28, 2015

(54) CABLE CLAMP ASSEMBLY WITH DOUBLE CAPTIVE SCREW

(75) Inventors: Eric S. Krieg, Cedarburg, WI (US); Bruce A. Behrendt, Muskego, WI (US); Gregory D. Ziegler, Mequon, WI (US); Craig R. Winterhalter, Cedarburg, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 338 days.

(21) Appl. No.: 13/547,681

(22) Filed: Jul. 12, 2012

(65) Prior Publication Data
US 2014/0014407 A1    Jan. 16, 2014

(51) Int. Cl.
*F16B 15/00* (2006.01)
*H02G 3/32* (2006.01)
*F16G 11/06* (2006.01)
*F16B 5/02* (2006.01)

(52) U.S. Cl.
CPC .................. *H02G 3/32* (2013.01); *F16G 11/06* (2013.01); *F16B 5/0275* (2013.01); *Y10T 24/3958* (2015.01)

(58) Field of Classification Search
USPC ............. 248/547, 51, 50, 68.1, 71, 74.1, 505; 174/159, 154, 191, 163 R; 361/825
See application file for complete search history.

(56) References Cited

U.S. PATENT DOCUMENTS

| | | | | |
|---|---|---|---|---|
| 1,341,113 A * | 5/1920 | Dottl et al. | ................... | 248/74.1 |
| 2,310,434 A * | 2/1943 | Hyman | ........................... | 248/71 |
| 2,961,210 A * | 11/1960 | Pfaff et al. | ................... | 248/74.5 |
| 3,085,129 A * | 4/1963 | Anderson | ..................... | 174/159 |
| 3,176,945 A * | 4/1965 | Anderson | ....................... | 248/71 |
| 5,178,503 A * | 1/1993 | Losada | .......................... | 411/441 |
| 6,038,852 A * | 3/2000 | Celi | ................................ | 60/761 |
| 6,489,569 B1 * | 12/2002 | Thomson | ..................... | 174/154 |
| 6,621,714 B1 * | 9/2003 | Li et al. | .......................... | 361/801 |
| 7,770,848 B2 * | 8/2010 | Johnson et al. | ................. | 248/65 |
| 8,413,934 B2 * | 4/2013 | Hara | ............................ | 248/68.1 |
| 2004/0099772 A1 * | 5/2004 | Durig et al. | .................. | 248/68.1 |
| 2004/0159751 A1 * | 8/2004 | Boon et al. | ................... | 248/74.1 |

OTHER PUBLICATIONS

"Connecting Your Ultra3000", pp. 3-11, Publication 2098-IN003E-EN-P Apr. 2004.

* cited by examiner

*Primary Examiner* — Bradley Duckworth
(74) *Attorney, Agent, or Firm* — Fay Sharpe LLP

(57) ABSTRACT

A cable clamp assembly includes a bracket and first and second fasteners. The first fastener includes a head, a threaded region, and a neck region. The second fastener includes a head, a lower threaded region, an upper threaded region, a lower neck region, and an upper neck region. The first fastener is captured in a first aperture of the bracket by location of the neck region of the first fastener in the first aperture. The second fastener is captured in a second aperture of the bracket by location of the upper neck region of the second fastener in the second aperture. The cable clamp assembly is captured to a wall by arranging the lower neck region of the second fastener to extend through a bore of the wall such that the upper and lower threaded regions of the second fastener are located on opposite sides of the wall.

18 Claims, 6 Drawing Sheets

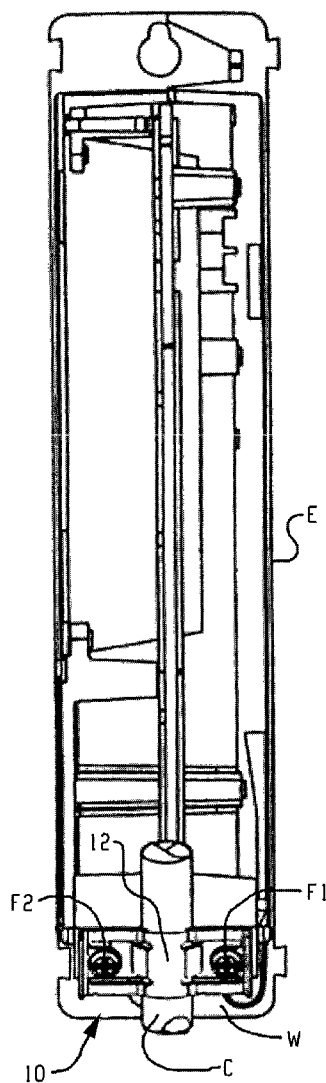
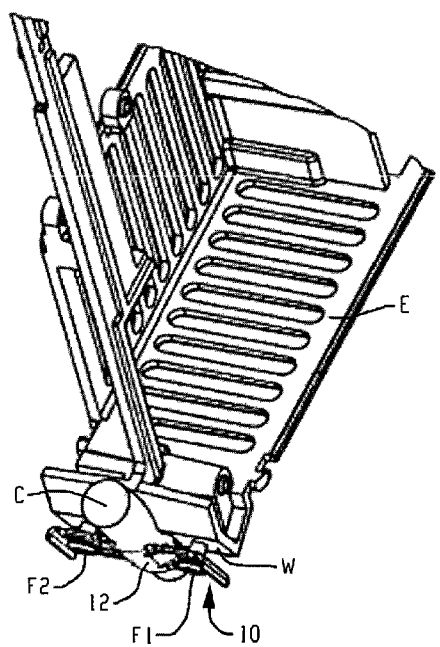
Fig. 1
Fig. 2

CABLE CLAMP ASSEMBLY WITH DOUBLE CAPTIVE SCREW

BACKGROUND

Electronic equipment enclosures such as used for industrial automation and motor drive electronics and the like commonly include one or more cable clamps or clamp assemblies secured to a wall of the enclosure or to a nearby location such as a chassis or rack or other piece of equipment using removable screws. These cable clamps are used to secure cables in a fixed position and also to provide an electrical ground path from a shield or other part of the cable to the enclosure housing or other structure to which the cable clamp is secured.

These prior cable clamps have been found to be suboptimal in several respects. In some cases, the clamp is structured so that it cannot accommodate cables of different gauges/diameters while still providing an effective ground connection with the cable being secured. Also, prior clamps are not effectively captured to the enclosure or other mounting location and/or the screws or other fasteners used to secure the clamp to the enclosure or other mounting location are not also captured to the clamp, itself. This can lead to dropped or misplaced clamps and/or fasteners which is inconvenient and can also cause problems in terms of damage to nearby equipment, failure of a technician to properly secure the associated cable, and other undesired results.

For these and other reasons, a need has been identified for a cable clamp assembly and fasteners for same that overcome the above deficiencies and others while providing better overall results.

SUMMARY

In accordance with one aspect of the present development, a cable clamp assembly includes a saddle bracket and first and second fasteners engaged with the saddle bracket. The first fastener includes a head, a threaded region, and a reduced diameter neck region located between said threaded region and the head. The second fastener includes a head, a lower threaded region, an upper threaded region, a lower reduced diameter neck region located between the lower and upper threaded regions, and an upper reduced diameter neck region located between the upper threaded region and the head of the second fastener. The first fastener is captured in a first aperture of the saddle bracket by engagement of the saddle bracket with the reduced diameter neck portion of the first fastener. The second fastener is captured in a second aperture of the saddle bracket by engagement of the saddle bracket with the upper or the lower reduced diameter neck portion of the second fastener.

In accordance with another aspect of the present development, a fastener includes a head and a shank extending outward from the head. The shank includes a lower threaded region, an upper threaded region, a lower reduced diameter neck region located between the lower and upper threaded regions, and an upper reduced diameter neck region located between the upper threaded region and the head of the second fastener. The lower reduced diameter neck region and the upper reduced diameter neck region include respective maximum outside diameters that are each less than a maximum outside diameter of the lower threaded region and that are each less than a maximum outside diameter of the upper threaded region.

In accordance with another aspect of the present development, a saddle bracket includes a one-piece electrically conductive body including a cable retainer portion including a retainer wall, and first and second wings that project outward from opposite first and second sides of the cable retainer portion, respectively. The retainer wall of the cable retainer portion comprises a curved inner surface. Each of the first and second wings includes first and second spaced-apart arms connected at their respective inner ends to the cable retainer portion, and an end wall that extends between and interconnects respective outer ends of the first and second arms. A first open space is defined between the first and second arms and the end wall of the first wing. A second open space is defined between the first and second arms and the end wall of the second wing.

BRIEF DESCRIPTION OF THE DRAWINGS

FIG. 1 is a front view of an electronics enclosure including a cable clamp and assembly in accordance with the present development operatively installed for the purpose of securing an associated cable to the enclosure;

FIG. 2 is a partial isometric view of the electronics enclosure of FIG. 1;

DETAILED DESCRIPTION

Figure 3:
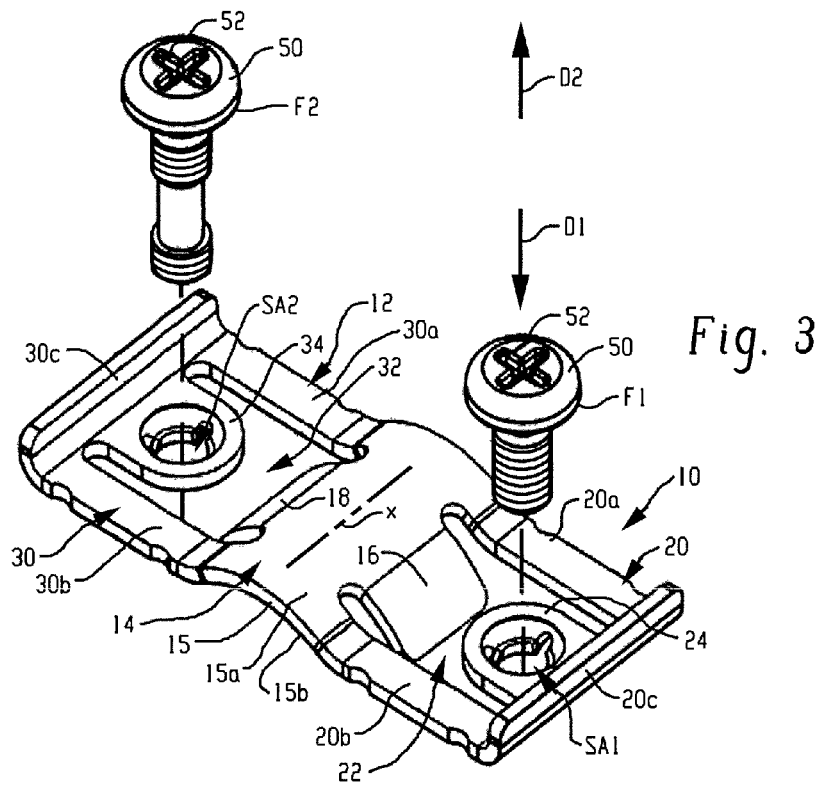
FIG. 3 is an isometric view of the clamp assembly of FIGS. 1 and 2, with the fasteners exploded from their respective operative positions.

FIGS. 1 and 2 are front and isometric views of part of an electronics enclosure E to which a cable clamp assembly 10 according to the present development is operatively installed/secured in order to secure and electrically ground an associated cable C to the enclosure. The clamp assembly 10 and its use are described herein with reference to the enclosure E, but it can alternatively be secured to and used in association with any other suitable mounting structure or location such as a chassis, a piece of equipment, or any other structure having a wall to which the clamp assembly can be secured as described herein.

The clamp assembly 10 comprises a saddle bracket 12 and first and second screws F1,F2 that are used to fixedly secure the saddle bracket 12 to a wall W of the enclosure E. The first and second fasteners F1,F2 also electrically connect the saddle bracket 12 to the wall W for electrically grounding the saddle bracket 12 (and a shield or other portion of the associated cable C retained by the saddle bracket 12) to the wall W and to any ground path to which the wall W is electrically connected. The enclosure E, itself, is conventional and typically manufactured from cast aluminum and/or another material such as a molded polymeric material. In the illustrated embodiment, the enclosure E and wall W thereof are defined from cast metal such as aluminum.

FIGS. 3-6 show the clamp assembly 10 by itself, including the saddle bracket 12 and the first and second screw fasteners F1,F2. The saddle bracket 12 comprises a metallic structure comprising a cable keeper or retainer portion 14 and first and second wings 20,30 that project laterally outward from opposite first and second lateral sides of the retainer portion 14. In the illustrated embodiment, the saddle bracket 12 is provided as a one-piece construction defined from spring steel or another steel alloy by a stamping operation and/or other metal working operation. The saddle bracket 12 is preferably fabricated or defined from a highly electrically conductive material such as metal to provide an electrical ground path as described, but could alternatively be defined from another electrically conductive or electrically non-conductive material. In the illustrated example, the saddle bracket 12 is defined as a one-piece stamping of spring steel.

The cable retainer/keeper portion 14 of the saddle bracket 12 comprises a retainer wall 15 that includes an outer surface 15a and an opposite inner surface 15b. The retainer wall 15 extends axially relative to a longitudinal axis X (FIG. 3) that extends parallel to the longitudinal axis of the associated cable C retained by the clamp assembly 10. The inner surface 15b of the retainer wall 15 is arcuate or otherwise concavely curved so as to conform to the outer surface of the cable C.

The first wing 20 of the saddle bracket 12 comprises first and second parallel, spaced-apart arms 20a,20b that are connected at their respective inner ends to opposite axial ends of the retainer wall 15. The arms 20a,20b project laterally outward from the retainer wall 15 and their respective outer ends are joined together by an end wall 20c. In the illustrated embodiment, the end wall 20c is upturned relative to the arms 20a,20b so as to define a projecting lip or flange which adds rigidity to the first wing 20. The arms 20a,20b and the end wall 20c of the first wing 20 define an open space 22 there between, which allows the wing 20 to flex as needed during use to accommodate different size and shape mounting locations. The retainer wall 15 comprises a first flap 16 that projects into the space 22 and that provides/defines an extension said curved inner surface 15b of the retainer wall 15. The first flap 16 is disconnected from the first and second arms 20a,20b and the end wall 20c so that the position and shape of the first flap 16 can be changed by its selective manual deformation (i.e., by bending the flap 16 relative to the main or fixed portion of the retaining wall 15 to which the arms 20a,20b of the first wing 20 are connected) in order to maximize surface area contact between the first flap 16 and an associated cable C being retained.

The first wing 20 of the saddle bracket 12 further comprises first screw pad 24 that is connected to and projects outwardly from the end wall 20c into the space 22 toward the retainer wall 15, such that the first screw pad 24 is located in the space 22 between the arms 20a,20b and the first flap 16. The first screw pad 24 is spaced from the arms 20a,20b and from the first flap 16, and its position relative to the arms 20a,20b and end wall 20c can be changed by its selective manual deformation. The first screw pad 24 comprises a first screw aperture SA1 defined there through and that is adapted for insertion and retention of the first fastener F1. The ability to alter the position of the screw pad 24 by its deformation is beneficial in order to accommodate different size and shape mounting locations for the saddle bracket 12.

As shown, the second wing 30 of the saddle bracket 12 is identical to the first wing 20, but it can vary in size and shape if desired. In the illustrated embodiment, the second wing 30 comprises first and second parallel, spaced-apart arms 30a, 30b that are connected at their respective inner ends to opposite axial ends of the retainer wall 15. The arms 30a,30b project laterally outward from the retainer wall 15 in a second direction that is opposite the first direction in which the first arms 20a,20b project. The respective outer ends of the arms 30a,30b are joined together by an end wall 30c. The end wall 30c is upturned relative to the arms 30a,30b so as to define a projecting lip or flange which adds rigidity to the second wing 30. The arms 30a,30b and the end wall 30c of the second wing 30 define an open space 32 there between, which allows the wing 30 to flex as needed during use to accommodate different size and shape mounting locations. The retainer wall 15 comprises a second flap 18 that projects into the space 32 and that provides/defines an extension said curved inner surface 15b of the retainer wall 15. The second flap 18 is located on the opposite side of the retainer wall from the first flap 16 and is defined symmetrically relative to the first flap 16. The second flap 18 is disconnected from the first and second arms 30a,30b and the end wall 30c so that the position and shape of the second flap 18 can be changed by its selective manual deformation (i.e., by bending the flap 18 relative to the main or fixed portion of the retaining wall 15 to which the arms 30a,30b of the second wing 30 are connected) in order to maximize surface area contact between the second flap 18 and an associated cable C being retained.

The second wing 30 of the saddle bracket 12 further comprises second screw pad 34 that is connected to and projects outwardly from the end wall 30c into the space 32 toward the retainer wall 15, such that the second screw pad 34 is located in the space 32 between the arms 30a,30b and the second flap 18. The second screw pad 34 is spaced from the arms 30a,30b and from the second flap 18, and its position relative to the arms 30a,30b and end wall 30c can be changed by its selective manual deformation. The second screw pad 34 comprises a second screw aperture SA2 defined there through and that is adapted for insertion and retention of the second fastener F2. The ability to alter the position of the screw pad 34 by its deformation is beneficial in order to accommodate different size and shape mounting locations for the saddle bracket 12.

The saddle bracket 12 provides for selective deformation of the wings 20,30 relative to the cable retainer portion 14 as required to accommodate different mounting locations of the saddle bracket 12. The flaps 16,18 of the retainer portion are selectively deformable to accommodate different sizes of cables C to ensure good mechanical and electrical grounding contact with the cable. The position of each screw pad 24,34 is also selectively deformable or bendable relative to the wings 20,30 and the flaps 16,18 to accommodate different required mounting locations for the saddle bracket 12, i.e., the screw pads 24,34 can be bent or pivoted by deforming the first and second wings 20,30 in the regions that respectively connect the screw pads 24,34 to the respective end walls 20c,30c. Those of ordinary skill in the art will recognize that the structure of the saddle bracket 12 thus provides improved versatility relative to known cable retaining bracket designs.

Figure 7:
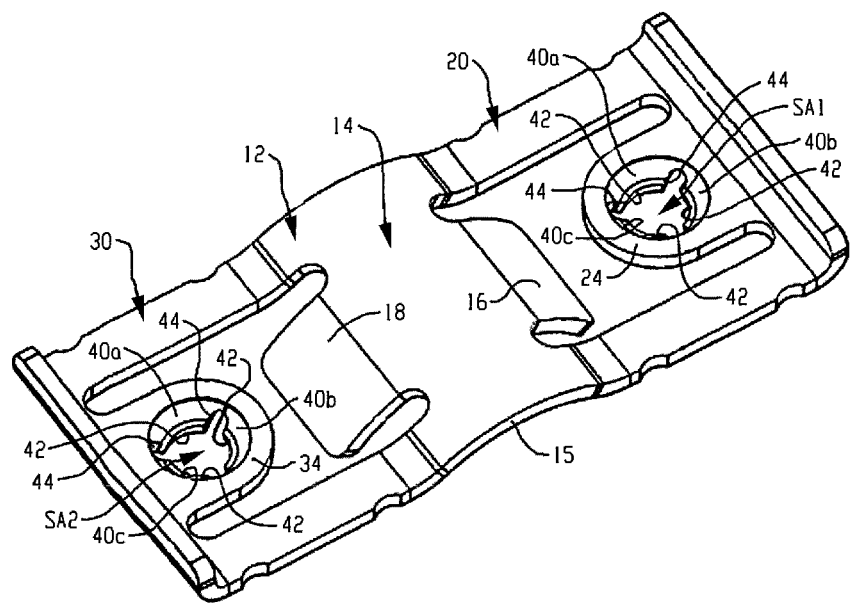
FIG. 7 is a top isometric view of the saddle bracket portion of the clamp assembly by itself.

Referring also to FIG. 7, each screw aperture SA1,SA2 is defined as a coined aperture comprising at least three fastener retaining tabs or flanges 40a,40b,40c that project radially inward toward each other and that each comprise a beveled tip 42 that extends through a circular arc section centered on the central axis of the aperture SA1,SA2. The fastener retaining tabs 40a,40b,40c are circumferentially separated from each other by radially extending spaces 44 such that each flange 40a-40c is able to flex independently from the others. The fastener retaining tabs 40a-40c are preferably angled or otherwise directed inward relative to the plane of the respective screw pads 24,34, e.g., by about 15 degrees, such that they converge radially inwardly toward each other while extending inwardly away from the pad 24,34. As described in further detail below, this angled orientation of the tabs 40a-40c facilitates insertion of the first and second screw fasteners F1,F2 into the respective apertures SA1,SA2 in an insertion direction D1 (FIG. 3) and inhibits withdrawal of the first and second screw fasteners F1,F2 from the respective apertures SA1,SA2 in a withdrawal direction D2 (FIG. 3). Also, the spaces 44 between the tabs 40a-40c are provided to facilitate axially insertion of the screw fasteners F1,F2 in the direction D1 and to minimize the chance for damage to the screw threads of the fasteners F1,F2 by increasing the flexibility of the tabs 40a-40c and by reducing circumferential contact between the threads of the screw fasteners F1,F2 and the tips 42 of the tabs 40a-40c. Tabs 40a-40c of the first wing 20 can be referred to as first tabs 40a-40c, and tabs 40a-40c of the second wing 30 can be referred to as second tabs 40a-40c.

Figure 8:
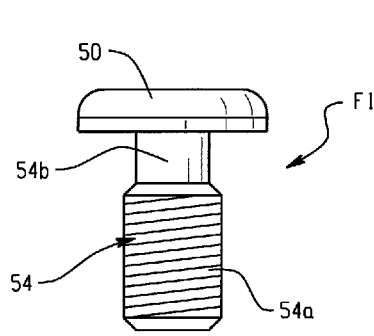
FIG. 8 is a side view of a single-captive fastener used with the clamp assembly of FIG. 1.
Figure 9:
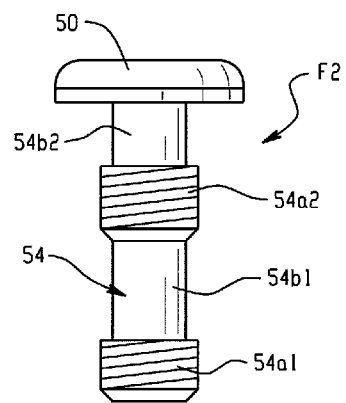
FIG. 9 is a side view of a double-captive fastener used with the clamp assembly of FIG. 1.

The first and second screw fasteners F1,F2 are respectively shown in FIGS. 8 and 9. The first screw fastener F1 comprises a head 50 including a driving recess or slot 52 (FIG. 3) for mating with a screwdriver or other associated driving tool. The first screw fastener F1 further comprises a shank 54 connected to and projecting or extending outwardly from the head 50 on the side opposite the driving recess/slot 52. The shank 54 comprises a threaded portion 54a and a reduced diameter unthreaded neck portion 54b located between and separating the threaded portion 54a and the head 50. The neck portion 54b also includes the transverse shoulder that interconnects the threaded portion 54a to the reduced diameter portion 54b. The neck portion 54b is sometimes referred to as a "captive" and the first screw fastener F1 is a single-captive fastener because it comprises only a single captive or neck portion 54b. The second screw fastener F2 also comprises a head 50 including a driving recess or slot 52 (FIG. 3) for mating with a screwdriver or other associated driving tool. The second screw fastener F2 comprises a shank 54 connected to and extending or projecting outwardly from the head 50 on the side opposite the driving recess/slot 52. The shank 54 comprises a first or lower threaded portion 54a1, a second or upper threaded portion 54a2, a first or lower reduced diameter unthreaded neck portion 54b1 located between and separating the first and second threaded portions 54a1,54a2, and a second or upper reduced diameter unthreaded neck portion 54b2 located between and separating the second threaded portion 54a2 and the head 50. The lower neck portion 54b1 also includes the transverse shoulders that interconnects the lower and upper threaded portion 54a1,54a2 to the lower reduced diameter portion 54b1, and the upper neck portion 54b2 also includes the transverse shoulder that interconnects the upper threaded portion 54a2 to the upper reduced diameter portion 54b2. As noted above, the neck portions 54b1,54b2 are sometimes referred to as "captives" and, therefore, the second screw fastener F2 is a double-captive fastener because it comprises two separate captives or neck portions 54b1,54b2.

The first and second screw apertures SA1,SA2 of the saddle bracket 12 are dimensioned relative to the fasteners F1,F2 such that the threaded portions 54a, 54a1,54a2 slide closely through the apertures SA1,SA2 while making contact with the tips 42 of the fastener retaining tabs/flanges 40a-40c when the fasteners F1,F2 are inserted into their respective apertures SA1,SA2 in the insertion direction D1. The fasteners F1,F2 need not be rotated during this insertion process; the fastener retaining tabs 40a-40c flex slightly in the direction D1 during insertion of the fasteners F1,F2 in the direction D1 to facilitate the fastener insertion operation. In contrast, the inwardly deflected fastener retaining tabs 40a-40c resist upward deflection in the opposite, withdrawal direction D2 toward the respective tabs 24,34 upon attempted axial withdrawal of the fasteners F1,F2 in the withdrawal direction D2 when the fastener retaining tabs 40a-40c are contacted by the threaded portions 54a,54a1,54a2 upon attempted withdrawal of the fasteners F1,F2 in the direction D2.

More particularly, when the fastener F1 is fully installed in the first screw aperture SA1, the tips 42 of the fastener retaining flanges 40a-40c are axially aligned with the reduced diameter neck portion 54b and the fastener F1 is captured in the first screw aperture SA1 by the fastener retaining flanges 40a-40c that restrict withdrawal of the fastener F1 in the direction D2 due to contact of the tips 42 of the fastener retaining flanges 40a-40c with the threaded portion 54a. The deflected orientation of the fastener retaining tabs 40a-40c in the insertion direction D1 ensures that the fastener retaining tabs 40a-40c will resist deflection in the withdrawal direction D2 when the tips 42 thereof are contacted by the threaded portion 54a upon attempted withdrawal of the fastener F1 in the withdrawal direction D2. The first fastener F1 can be removed from its aperture SA by unscrewing rotation of the fastener F1 with threaded engagement between the tips 42 of the fastener retaining flanges 40a-40c and the threaded region 54a of the fastener F1.

Similarly, when the second fastener F2 is fully installed in the second screw aperture SA2, the tips 42 of the fastener retaining flanges 40a-40c are axially aligned with the second/upper reduced diameter neck portion 54b2 and the fastener F2 is captured in the aperture SA2 by the fastener retaining flanges 40a-40c that restrict withdrawal of the fastener F2 in the direction D2 due to contact of the tips 42 of the fastener retaining flanges 40a-40c with the second/upper threaded portion 54a2. The deflected orientation of the fastener retaining tabs 40a-40c in the insertion direction D1 ensures that the fastener retaining tabs 40a-40c will resist deflection in the withdrawal direction D2 when the tips 42 thereof are contacted by the threaded portion 54a2 upon attempted withdrawal of the second fastener F2 in the withdrawal direction D2. The second fastener F2 can be partially removed from its screw aperture SA2 (to the position shown in FIG. 4) by unscrewing rotation of the fastener F2 while the tips 42 of the fastener retaining flanges 40a-40c are engaged with and the second/upper threaded region 54a2 of the fastener F2.

Figure 4:
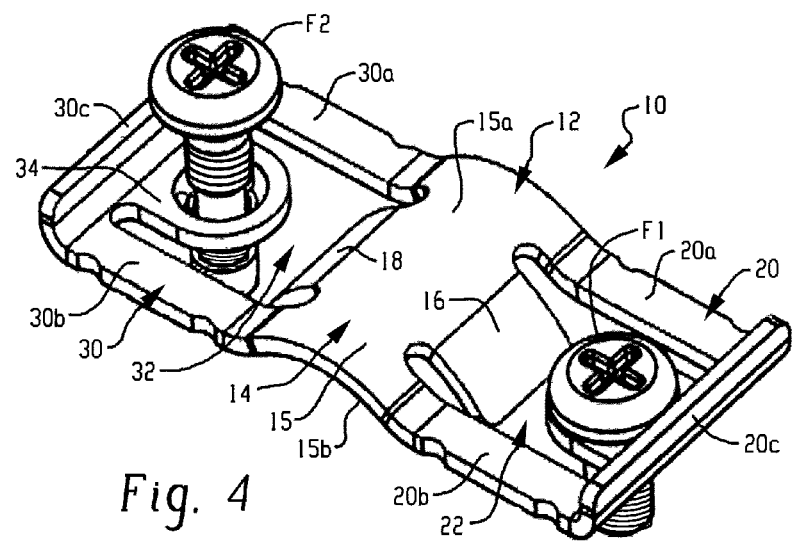
FIG. 4 is similar to FIG. 3, but shows one of the fasteners fully installed and the other fastener partially installed relative to the saddle bracket portion of the clamp assembly.
Figure 5:
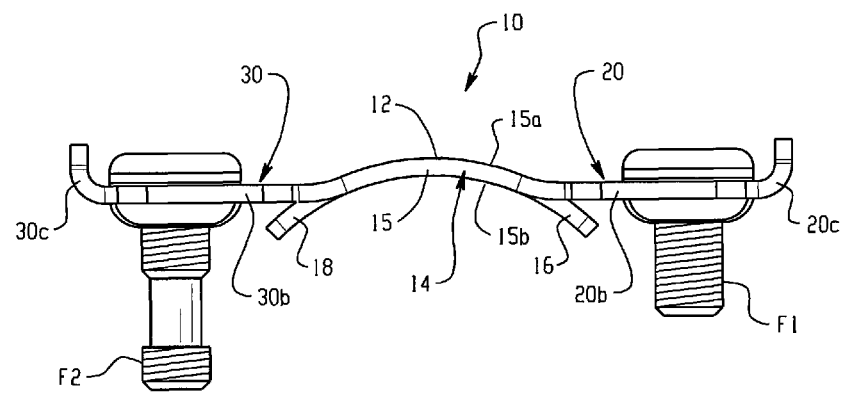
FIG. 5 is a side view of the clamp assembly shown in FIG. 4, with both fasteners fully installed.
Figure 6:
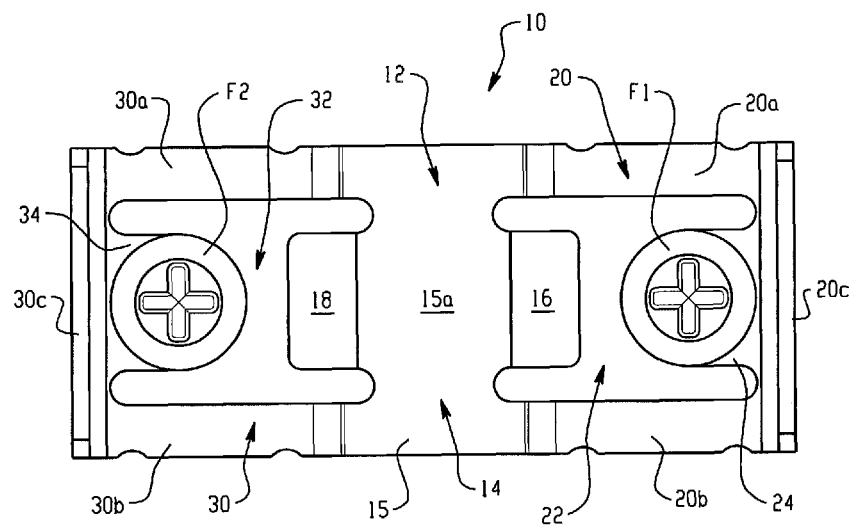
FIG. 6 is a top view of the clamp assembly shown in FIG. 4.

When the second fastener F2 is located in its partially installed position as shown in FIG. 4, tips 42 of the fastener retaining flanges 40a-40c are axially aligned with the first/lower reduced diameter neck portion 54b1 and the second fastener F2 remains captured in the aperture SA2 by the fastener retaining flanges 40a-40c that restrict withdrawal of the fastener F2 in the direction D2 due to contact of the tips 42 of the fastener retaining flanges 40a-40c with the first/lower threaded portion 54a1. The deflected orientation of the fastener retaining tabs 40a-40c in the insertion direction D1 ensures that the fastener retaining tabs 40a-40c will resist deflection in the withdrawal direction D2 when the tips 42 thereof are contacted by the first threaded portion 54a1 upon further attempted withdrawal of the second fastener F2 in the direction D2. The second fastener F2 can be fully removed from its aperture SA2 (to the position shown in FIG. 3) by unscrewing rotation of the fastener F2 while the tips 42 of the fastener retaining flanges 40a-40c are engaged with the first threaded region 54a1 of the fastener F2.

Figure 10:
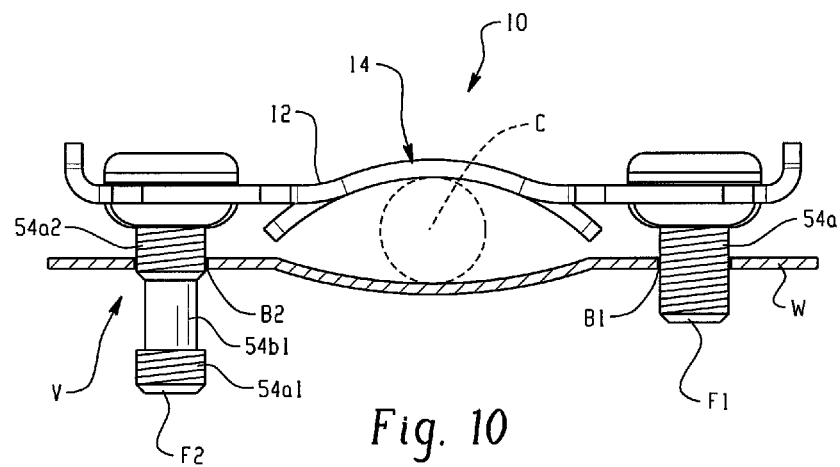
FIG. 10 is a side view similar to FIG. 5, showing the clamp assembly installed on an enclosure or other associated mounting location/structure and secured in its engaged position relative to an associated cable being retained.
Figure 11:
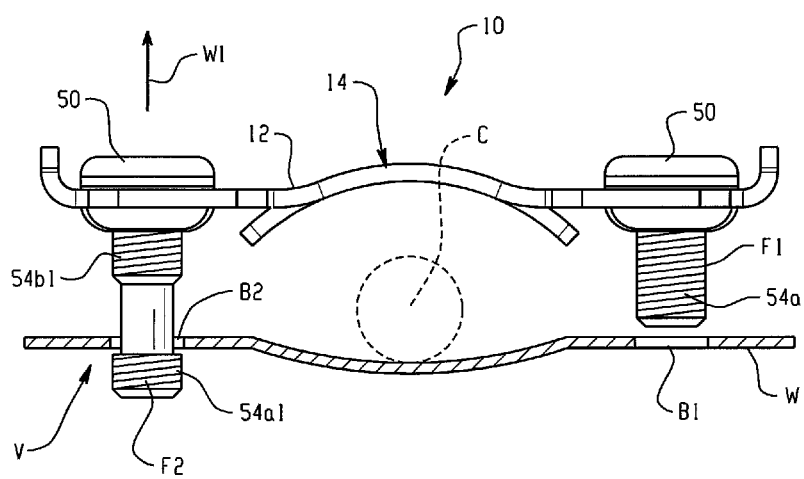
FIG. 11 is similar to FIG. 10, but shows the clamp assembly in its disengaged position relative to the associated cable and enclosure.

FIGS. 10 and 11 illustrate use of the clamp assembly 10 to secure and associated cable C adjacent a wall W of an enclosure or other structure. The wall W includes a first tapped aperture or bore B1 that is dimensioned to be engaged by the threads of the threaded region 54a of the first fastener F1. Similarly, the wall W includes a second tapped aperture or bore B1 that is dimensioned to be engaged by the threads of the first/lower threaded region 54a1 and the second/upper threaded region 54a2 of the second fastener F2. Also, in the region of at least the second tapped aperture/bore B1, the enclosure E or other associated mounting structure/location for the clamp assembly 10 includes or defines an open region or void V on the side of the wall that is opposite the side where the associated cable C is to be retained.

FIG. 10 shows the threaded region 54a of the first fastener F1 engaged with the first tapped bore B1 and shows the second/upper threaded region 54a2 of the second fastener F2 engaged with the second tapped bore B2 such that the first and second fasteners F1,F2 fixedly secure the saddle bracket 12 adjacent the wall W with the associated cable C captured between the wall W and the retainer portion 14 of the saddle clamp bracket 12. It should be noted that the second fastener F2 is advanced into the second tapped bore B2 of the wall W sufficiently so that the first/lower threaded region 54a1 (and optionally the entire axial length of the first/lower neck region 54b1) have passed completely through the second tapped bore B2 into the void V, and so that the second/upper threaded region 54a2 is threadably engaged with the second tapped bore B2. Thus, the first/lower reduced diameter neck portion 54b1 and the first/lower threaded portion 54a1 of the second fastener F2 (and optionally also part of the threaded portion 54a of the first fastener F1 as shown) extend into the void V behind the wall W.

To remove the associated cable C from the position shown in FIG. 10, a user manually unscrews the first fastener F1 from the first bore B1 using a screwdriver or other associated tool engaged with the fastener head 50 so that the first fastener F1 is completely disengaged from the first tapped bore B1 as shown in FIG. 11. The first fastener F1 remains captured in the first screw aperture SA1 of the saddle bracket 12 due to the engagement of the fastener retaining flanges 40a-40 in the reduced diameter neck region 54b. Similarly, a user manually unscrews the second/upper threaded region 54a2 of the second fastener F2 from the second bore B2 using a screwdriver or other associated tool engaged with the fastener head 50 so that the second fastener F2 is partially disengaged from the second tapped bore B2 as shown in FIG. 11. In FIG. 11, it can be seen that the second fastener F2 remains captured in the second screw aperture SA2 of the saddle bracket 12 by engagement of the fastener retaining flanges 40a-40c in the second/upper reduced diameter "captive" region 54b2, and the second fastener F2 also is captive to the wall W due to the presence of the first/lower threaded region 54a1 within the void V. In this position, the lower threaded region of the second fastener 54a1 is captured behind the wall structure W because its maximum outside diameter is greater than the minimum inside diameter of the second tapped bore B2, and the lower and upper threaded regions 54a1,54a2 are located on opposite sides of the wall structure W and are connected by the lower reduced diameter neck region 54b1 that extends through the second tapped bore B2. The second fastener F2 cannot be completely removed from the second tapped bore B2 by mere axial movement W1 alone because the first/lower threaded region 54a1 is larger in diameter that the second tapped bore B2. As such, the second fastener F2 can only be completely separated from the wall W by unscrewing rotation of the fastener F2 combined with an axial withdrawal force in the direction W1 so that the first/lower threaded region 54a1 can be threaded in the reverse direction through the second tapped bore B2 in the direction W1. Accordingly, the second fastener F2 provides a double captive capability because the clamp assembly 10 (including the saddle clamp 12 and first and second fasteners F1,F2) is captured to the wall W by engagement of the wall W with the first/lower neck/captive 54b1 and the second fastener F2 is, itself, captured in the second screw aperture SA2 by engagement of the fastener retaining flanges 40a-40c in the second/upper neck/captive 54b2.

Figure 12:
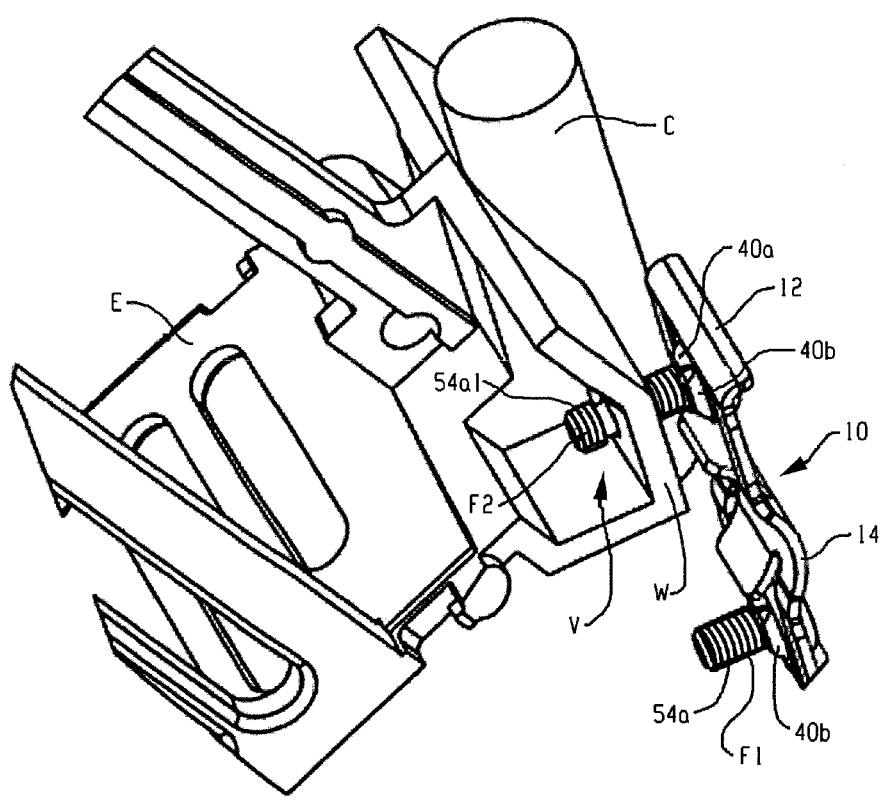
FIG. 12 is a partial isometric view of the enclosure of FIG. 1, showing the clamp assembly captured to a wall of the enclosure while in its disengaged position relative to an associated cable to allow for removal (and placement) of the cable relative to a wall of the enclosure.

When the clamp assembly 10 is arranged in its disengaged position as described with reference to FIG. 11, the saddle bracket 12 is able to be manually pivoted about the second fastener F2 relative to the wall W to an opened position where the cable retainer portion 14 is spaced from the associated cable C as shown in FIG. 12. When the saddle bracket 12 is pivoted to its opened position as shown in FIG. 12, the associated cable C can be moved away from the wall W (or placed in position adjacent the wall W). When the cable C is positioned adjacent the wall W, the saddle bracket 12 can be pivoted back to its operative position with the retainer portion 14 thereof covering the cable C and the first and second fasteners F1,F2 are then engaged with the first and second tapped bores B1,B2 of the wall W as shown in FIG. 10 to secure the saddle bracket 12 in its operative position relative to the wall and to retain the cable C between the retainer portion 14 and the wall W.

The development has been described with reference to preferred embodiments. Those of ordinary skill in the art will recognize that modifications and alterations to the preferred embodiments are possible. The disclosed preferred embodiments are not intended to limit the scope of the following claims, which are to be construed as broadly as possible, whether literally or according to the doctrine of equivalents.

The invention claimed is:

1. A cable clamp assembly comprising:
   a saddle bracket;
   first and second fasteners engaged with said saddle bracket;
   said first fastener comprising a head, a threaded region, and a reduced diameter neck region located between said threaded region and said head;
   said second fastener comprising a head, a lower threaded region, an upper threaded region, a lower reduced diameter neck region located between said lower and upper threaded regions, and an upper reduced diameter neck region located between said upper threaded region and said head of said second fastener;
   said first fastener captured in a first aperture of said saddle bracket by location of said reduced diameter neck portion of said first fastener in said first aperture of said saddle bracket;
   said second fastener captured in a second aperture of said saddle bracket by location of said upper or said lower reduced diameter neck portion of said second fastener in said second aperture of said saddle bracket.

2. The cable clamp assembly as set forth in claim 1, wherein said second fastener is captured in said second aperture of said saddle bracket by location of said upper reduced diameter neck region of said second fastener in said second aperture of said saddle bracket.

3. The cable clamp assembly as set forth in claim 1, wherein said saddle bracket is defined from a one-piece metallic construction.

4. The cable clamp assembly as set forth in claim 3, wherein said saddle bracket comprises:
   a cable retainer portion comprising a retainer wall; and,
   first and second wings that project outward from opposite first and second sides of said cable retainer portion, respectively.

5. The cable clamp assembly as set forth in claim 4, wherein said retainer wall of said cable retainer portion comprises a curved inner surface.

6. The cable clamp assembly as set forth in claim 5, wherein said first and second wings each comprise:
   first and second spaced-apart arms connected at their respective inner ends to said cable retainer portion;
   an end wall that extends between and interconnects respective outer ends of said first and second arms;
   a first open space defined between said first and second arms and said end wall of said first wing; and
   a second open space defined between said first and second arms and said end wall of said second wing.

7. The cable clamp assembly as set forth in claim 6, wherein:
   said first wing comprises a first screw pad in which said first aperture is defined;
   said second wing comprises a second screw pad in which said second aperture is defined.

8. The cable clamp assembly as set forth in claim 7, wherein said first and second screw pads comprise a plurality of fastener retaining tabs that surround said first and second apertures, respectively, wherein said fastener retaining tabs are circumferentially separated from each other by spaces, and wherein said fastener retaining tabs of said first screw pad inhibit axial movement of said threaded region of said first fastener through said first aperture and said fastener retaining tabs of said second screw pad inhibit axial movement of said lower and upper threaded regions of said second fastener through said second aperture.

9. The cable clamp assembly as set forth in claim 8, wherein:
   said plurality of fastener retaining tabs of said first wing are angled relative to a plane in which said first screw pad is located;
   said plurality of fastener retaining tabs of said second wing are angled relative to a plane in which said second screw pad is located.

10. The cable clamp assembly as set forth in claim 8, wherein:
    said first screw pad is connected to said end wall of said first wing and extends into said first open space toward said cable retainer portion;
    said second screw pad is connected to said end wall of said second wing and extends into said second open space toward said cable retainer portion.

11. The cable clamp assembly as set forth in claim 8, wherein said retainer wall of said cable retainer portion comprises:
    a first flap that extends into said first open space and that is spaced from said first and second arms and said first screw pad of said first wing;
    a second flap that extends into said second open space and that is spaced from said first and second arms and said second screw pad of said second wing.

12. The cable clamp assembly as set forth in claim 11, wherein said first and second flaps define respective extensions of said curved inner surface of said retainer wall and are adapted to maximize electrical contact with an associated cable to be retained by said cable clamp assembly.

13. The cable clamp assembly as set forth in claim 12, wherein said first and second flaps are selectively positionable by selective manual deformation of said flaps to maximize contact between said first and second flaps and an associated cable to be retained by said cable clamp assembly.

14. The cable clamp assembly as set forth in claim 13, wherein:
    said first screw pad is selectively positionable relative to said first and second arms of said first wing by manually bending said first screw pad relative to said first and second arms of said first wing;
    said second screw pad is selectively positionable relative to said first and second arms of said second wing by manually bending said second screw pad relative to said first and second arms of said second wing.

15. The cable clamp assembly as set forth in claim 2, wherein said cable clamp assembly is connected to a wall structure that comprises first and second tapped apertures, said threaded region of said first fastener engaged with said first tapped aperture and said upper threaded region of said second fastener engaged with said second tapped aperture.

16. The cable clamp assembly as set forth in claim 2, wherein said cable clamp assembly is captured to a wall structure that comprises first and second tapped apertures, wherein said lower reduced diameter neck region of said second fastener extends through said second tapped aperture of said wall structure and said lower threaded region of said second fastener is captured behind said wall structure such that said lower and upper threaded regions are located on opposite sides of said wall structure.

17. A saddle bracket comprising:
    a one-piece electrically conductive body comprising:
    a cable retainer portion comprising a retainer wall; and,
    first and second wings that project outward from opposite first and second sides of said cable retainer portion, respectively;
    wherein said retainer wall of said cable retainer portion comprises a curved inner surface;
    each of said first and second wings comprising:
    first and second spaced-apart arms connected at their respective inner ends to said cable retainer portion;
    an end wall that extends between and interconnects respective outer ends of said first and second arms;
    a first open space defined between said first and second arms and said end wall of said first wing; and
    a second open space defined between said first and second arms and said end wall of said second wing, wherein:
    said first wing comprises a first screw pad in which a first aperture is defined;
    said second wing comprises a second screw pad in which a second aperture is defined; and
    said first and second screw pads comprise a plurality of fastener retaining tabs that surround said first and second apertures, respectively, wherein said fastener retaining tabs are circumferentially separated from each other by spaces.

18. The saddle bracket as set forth in claim 17, wherein said retainer wall of said cable retainer portion comprises:
    a first flap that extends into said first open space and that is spaced from said first and second arms and said first screw pad of said first wing;
    a second flap that extends into said second open space and that is spaced from said first and second arms and said second screw pad of said second wing.

* * * * *